United States Patent [19]
Christman

[11] Patent Number: 5,517,947
[45] Date of Patent: May 21, 1996

[54] SIFTING LITTER-BOX

[76] Inventor: John W. Christman, 1710 White Oak, Houston, Tex. 77009

[21] Appl. No.: 445,473

[22] Filed: May 22, 1995

[51] Int. Cl.$^6$ .............................. A01K 29/00; B07B 1/00
[52] U.S. Cl. ............................ 119/166; 119/165; 209/373
[58] Field of Search ....................... 119/165, 166, 119/167, 170; 209/373, 374, 417, 418, 419

[56] References Cited

U.S. PATENT DOCUMENTS

| | | |
|---|---|---|
| 3,796,188 | 3/1974 | Bradstreet . |
| 4,217,857 | 8/1980 | Geddie . |
| 4,505,226 | 3/1985 | Carlson . |
| 4,602,593 | 7/1986 | Gross . |
| 4,615,300 | 10/1986 | McDonough . |
| 4,771,731 | 9/1988 | Derx et al. . |
| 5,325,815 | 7/1994 | Gumpesberger ............ 119/166 |

*Primary Examiner*—Robert P. Swiatek
*Assistant Examiner*—Yvonne R. Abbott

[57] ABSTRACT

A sifting litter-box utilizing two identical litter trays($8a,8b$), each with sieve openings($26a,26b$) integrated into one sidewall($18a,18b$). The trays are nested so that their respective integrated sieve openings($26a,26b$) are on diametrically opposed sides of the nested pair of trays, thereby the backwall($22b$) of the lower tray($8b$) closes off the sieve openings($26a$) of the upper tray($8a$) when nested one atop the other. The litter($34$) occupying only the top tray($8a$) is, after use, sifted into the bottom tray($8b$) by lifting the top tray($8a$) and tilting its contents toward its sieve-wall($18a$) allowing the reusable litter to pass through its sieve openings($26a$) and form a static pile of sifted reusable litter($34$) at the backwall($22b$) of the bottom tray($8b$). Feces and urine clumps($38$) are retained in the top tray($8a$) which in then emptied. The emptied top tray($8a$) is sanitized and is nested as the bottom tray($8b$), with the former bottom tray($8b$) with the reusable litter pile becoming the top tray($8a$) and once again the sieve-wall($18a$) of the upper tray($8a$) is closed off by the backwall($22b$) of the lower tray($8b$). The nested tray array is then shaken to level the sifted litter pile readying the sifting litter-box for reuse.

9 Claims, 5 Drawing Sheets

SIFTING LITTER-BOX

BACKGROUND FIELD OF INVENTION

This invention relates in general to devices for sifting particulate materials, and in particular to the separation and disposal of feces and urine clumps from reusable litter.

BACKGROUND-DESCRIPTION OF PRIOR ART

The use of devices to sift siftable or particulate material to remove relatively larger items found in the material is well known. Sifting devices enjoy a wide range of uses, from separating aggregates and other granular materials in quarry or concrete mixing operations, to sifting ingredients for baked foods, to use with pet litter-boxes.

Pet litter sifting devices not only reduce the unpleasantness of the operation, but they reduce waste by minimizing the amount of unused litter being thrown out, and so more litter is reused.

A host of innovation applied to the process of separating feces and urine clumps out of reusable litter, from elaborate electrical driven cyclic devices with conveyors, rakes, traps, hoppers, to manually-operated mechanical devices with hand-cranks driving cylinders, rakes, sieves: to the traditional hand-held spoons, trowels, scoop sieves, and strainers of various sorts. Examples of such devices are shown in U.S. Pat. Nos. 3,796,188, 4,217,857, 4,505,226, 4,602,593, 4,615,300, and 4,771,731. Many of the prior art litter-boxes devices are expensive to manufacture, impractical and unduly complex to make and use. They waste money, time and effort. In many cases, sieves are used in combination with imperforate trays to rap the reusable litter. Devices employing trays that have an integrated sieve built into the bottom of each tray require three or more trays to be nested together in an involved stacking scheme to have sufficient sieve blockage to retain the litter sieved from the uppermost tray such as the embodiments portrayed in U.S. Pat. No. 5,325,815, Gumpesberger 1993, which are still more complicated to use and to manufacture than needs be. The use of litter tray-liners for the majority of the prior art is a non-option and cumbersome at best in those remaining.

Prior art has revealed shortcomings in sifting methodology and in particular to the art of sieving pet excrement and urine clumps from reusable litter. Mechanical and electrical litter sieving devices were found to be generally impractical because of complicated construction, involved usage and too expensive. The following shortcomings were found in conventional manual litter sieving devices (not shown).

(1) Hand-held sifting implements are an additional expense separate from the expense of the litter-box.

(2) Using and maintaining hand-held sifting implements in addition to a litter-box is an unnecessary complication.

(3) The soiled litter scoops, spoons, trowels, and small shovels are unsightly and unsanitary when stored near the litter-box.

(4) It is necessary to repetitively push the blade of hand-sifting implements through the litter during a single litter-box cleaning wasting time and motion by sifting some of the same litter multiple times.

(5) Many pet owners, especially the elderly, find it difficult to use the scoops, spoons, trowels, and small shovels to pick up fecal matter from the litter-box.

(6) The hand-sifting process, inadvertently puts one in very close prolonged proximity to feces and urine clumps, which increases the risk of infection from Toxoplamosis to pregnant women, a disease which is known to be prevalent where cat fecal matter is not properly disposed of.

(7) Oftentimes the use of these conventional devices results in some of the fecal matter being inadvertently left in the litter.

(8) Hand-sifting implements, though simple to learn to use, require a manual dexterity learning curve to use effectively.

(9) Regardless of degree of manual dexterity achieved using current hand-held sifting implements it is still unnecessarily time consuming.

(10) Regardless of degree of manual dexterity achieved using current conventional methods and implements occasional inadvertent mishandling is inevitable.

(11) Encourages procrastination because of cumbersome conventional implements, unpleasant proximity, and time consuming methodology

(12) Cumbersome conventional implements, unpleasant proximity, and time consuming methodology discourages ownership of multiple cats

(13) Most of the current art requires off-loading of litter for periodic conventional cleaning and sanitation of litter-boxes

(14) Prior art devices using trays having integrated sieves have required three or more trays in a nested array.

OBJECTS AND ADVANTAGES

Accordingly, several objects and advantages of my sifting litter-box are:

(1) to provide a litter sifting device that eliminates the need to purchase and maintain separate hand-sifting implements.

(2) to provide a sifting device fully functional and efficient having as few as two nested trays.

(3) to provide a sifting device so fundamental in design and use, such that it obviates many of the disadvantages and drawbacks of prior art sifting devices and methods.

(4) to provide a sifting device totally devoid of complicated mechanical and/or electrical appliances.

(5) to provide a sifting device that is elementary in design and as effective as the best among the sifting systems currently found in prior art.

(6) to provide a sifting device that sifts effectively in one pass.

(7) to provide a sifting device that dramatically reduces manual litter-box sifting time from minutes to seconds.

(8) to provide a sifting device in which no reusable material is lost due to inadvertent mishandling as is experienced in most current methods requiring a degree of manual dexterity.

(9) to provide a litter sifting device where it is possible to separate, and dispose of, feces and urine clumps from reusable litter without ever coming in contact with the litter, feces, or urine clumps.

(10) to provide a litter sifting device that eliminates the need to rake or dig around in litter to locate buried feces or urine clumps.

(11) to provide a litter sifting device that can effectively operate with litter tray-liners.

(12) to provide a litter sifting device that eliminates the need to off-load litter into an unrelated container for litter-box sanitization.

(13) to provide a litter sifting device which will encourage the reduction of procrastination, by making the most objectionable cat duty, much less objectionable, thereby promoting an odor-free litter-box environment.

(14) to provide a litter sifting device that greatly reduces the chore of owning multiple cats and litter-boxes.

(15) to provide a sifting device that could be readily adapted to a multi-step sieving requirement necessitating a nested array of three or more trays with graduated sieve opening sizes for separating various sized material in a heterogeneous siftable mixture.

Still further objects and advantages will become apparent from a consideration of the ensuing description and drawings.

DRAWING FIGURES

The foregoing and additional objects and features of the sifting litter-box will appear from the following specification in which several possible embodiments have been set forth in conjunction with the accompanying drawings.

Figure 1:
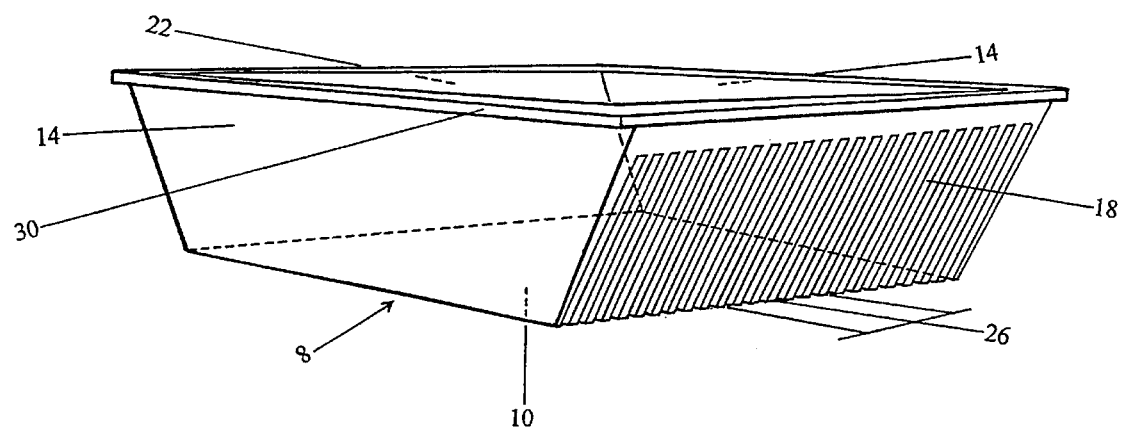
FIG. 1 is a perspective view of one embodiment of a single sifting tray.

| Reference Numerals in Drawings | | | |
|---|---|---|---|
| 8 | sifting tray | 10 | base of tray |
| 14 | sidewall of tray | 18 | sieve-wall of tray |
| 22 | backwall of tray | 26 | sieve openings |
| 30 | perimeter flange of tray | 34 | litter |
| 38 | feces and urine clumps | | |

DESCRIPTION-FIGS. 1 to 7

FIG. 1 shows a typical embodiment of one of the trays 8 used in the present two-tray sifting device capable of containing a manageable quantity of siftable material 34. The tray having a base 10 and sidewalls 14, 18, 22 projecting upwardly and outwardly from the base culminating at the top in a supporting perimeter flange 30. One of the upwardly projecting sidewalls has a plurality of openings 26 sized to permit siftable material 34 to pass through and to prevent the passage of substantially larger objects 38 found in the material.

Figure 2:
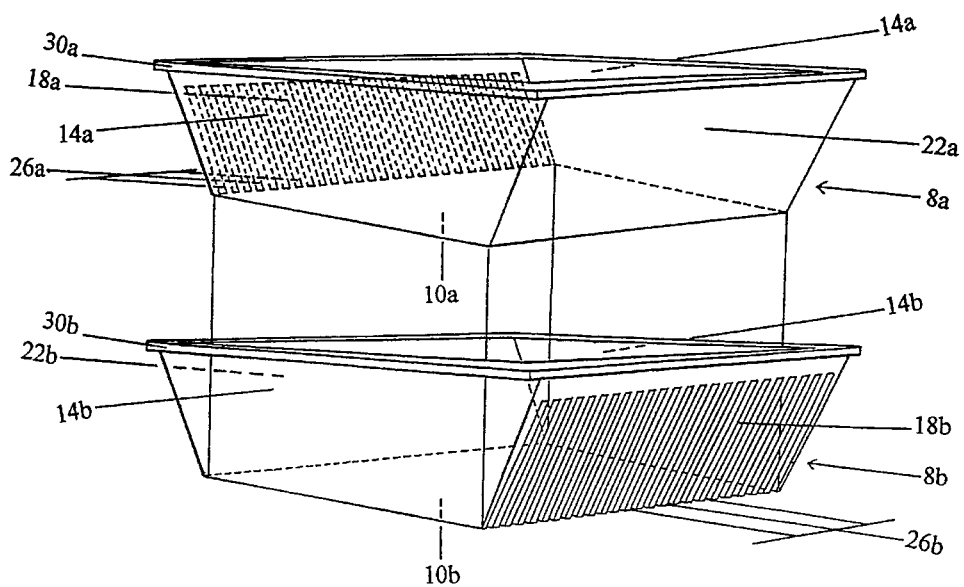
FIG. 2 is a perspective view of the orientation for nesting two sifting trays.

FIG. 2 shows a two-tray 8a 8b litter sifting device having corresponding profiles so as to be capable of being nested one atop another to form a vertically nested array, and each tray 8a 8b is oriented such that their respective sieve openings 26a 26b integrated into sieve-walls 18a 18b are in diametric opposition.

Figure 3:
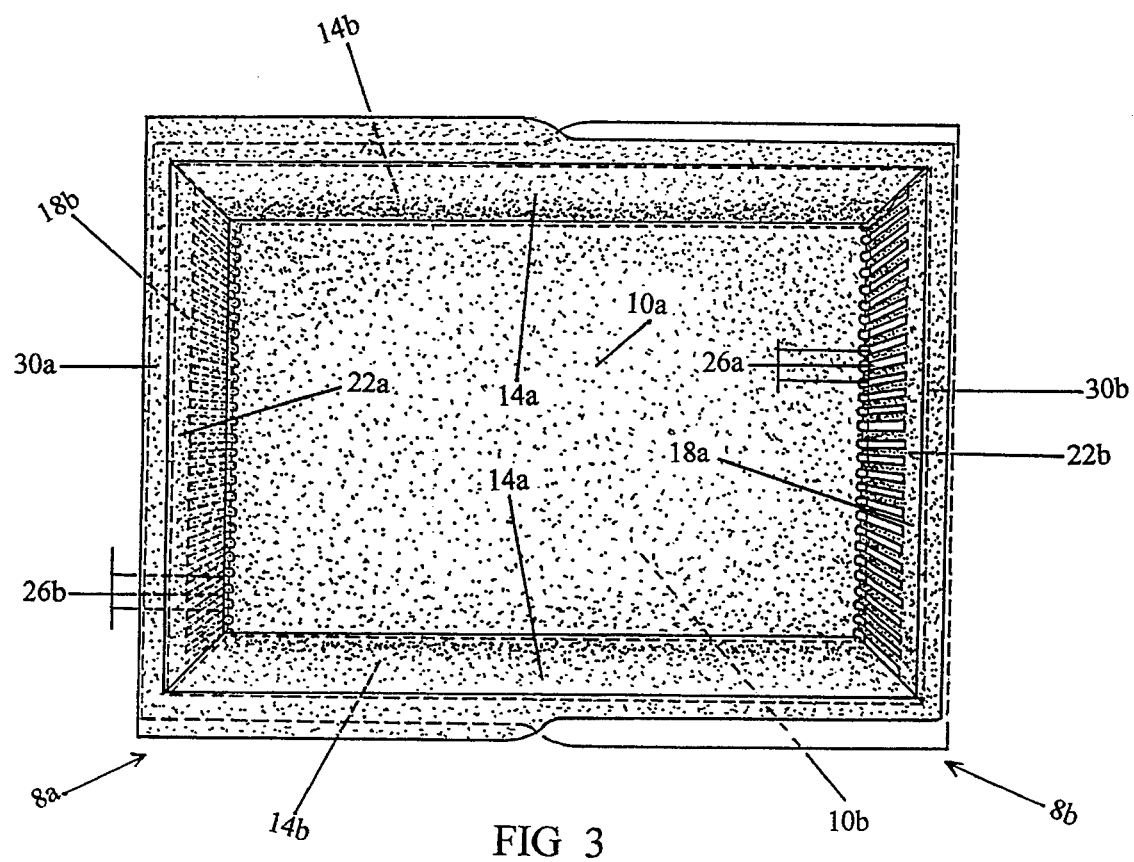
FIG. 3 is a top view of a nested pair of empty sifting trays showing nesting orientation with an exemplary embodiment of a perimeter flange design facilitating manual gripping.

FIG. 3 illustrates that the orientation provides a solid wall 22b to block the sieve openings 26a of tray 8a prohibiting the material to leak out of the sieve openings 26b of tray 8b. FIG. 3 also shows a possible embodiment of the perimeter flange 30a 30b which further facilitates manual grasping of the top tray's flange 30a when lifting the top tray out of the nest at the commencement of the sifting operation.

Figure 4:
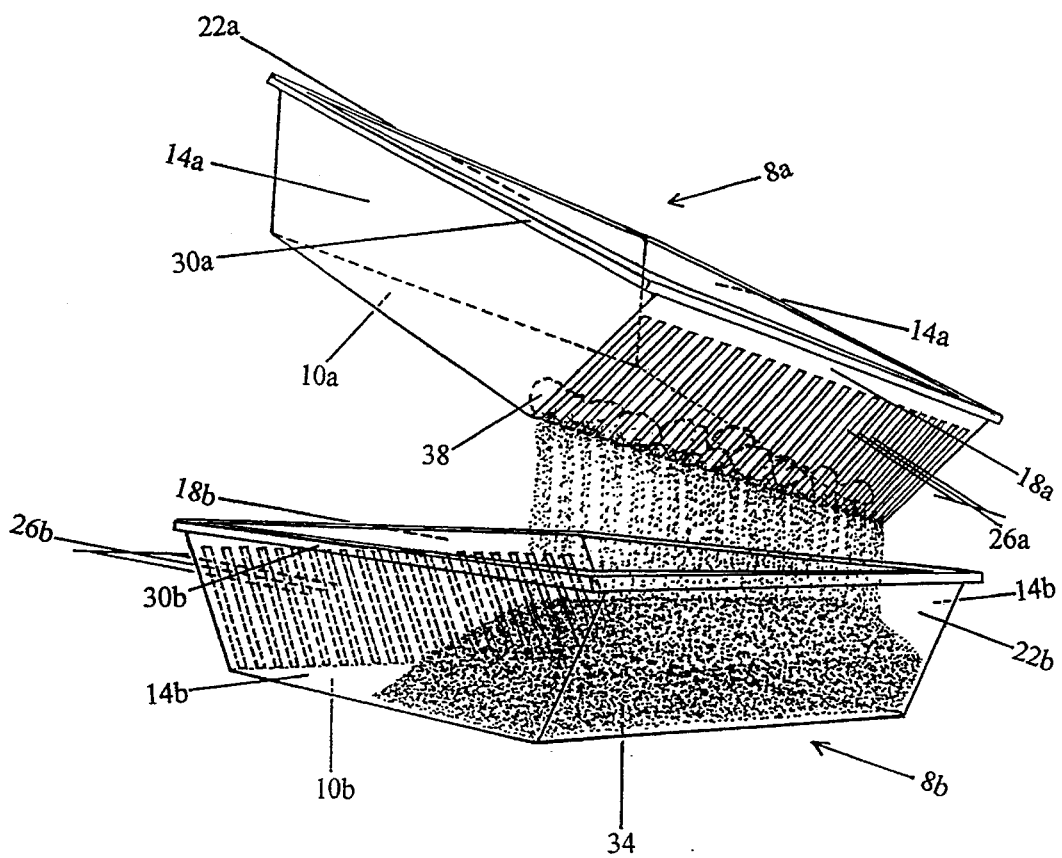
FIG. 4 is a perspective view showing: relative upper and lower tray positioning during sifting, separated feces and urine clumps, and the developing static pile of sifted reusable litter.

FIG. 4 illustrates the relative positioning of the top 8a and bottom 8b trays during the sifting operation and the developing static pile of sifted litter 34, and the separated feces and urine clumps 38 retained in the top tray 8a.

Figure 5:
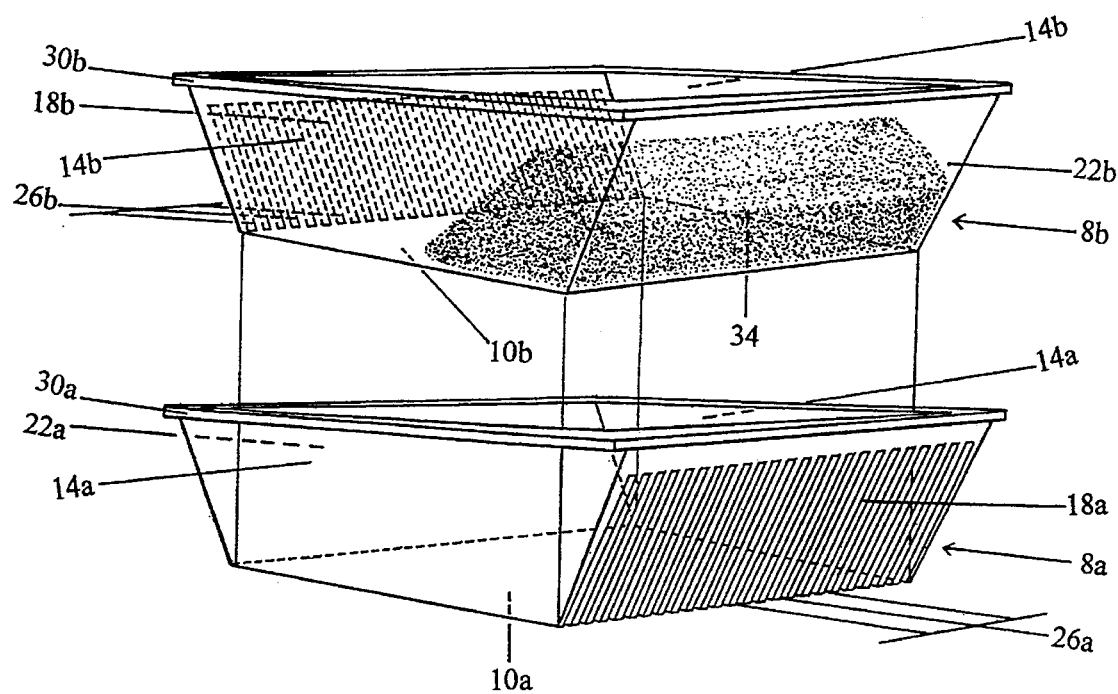
FIG. 5 is a perspective view of tray orientation when preparing to nest the tray containing the sifted static litter pile into the emptied and cleansed tray formerly containing the retained feces and urine clumps.

FIG. 5 shows the respective orientation of trays 8a 8b to one another just prior to nesting tray 8b containing the undisturbed sifted static pile of litter 34, into the emptied and cleansed tray 8a.

Figure 6:
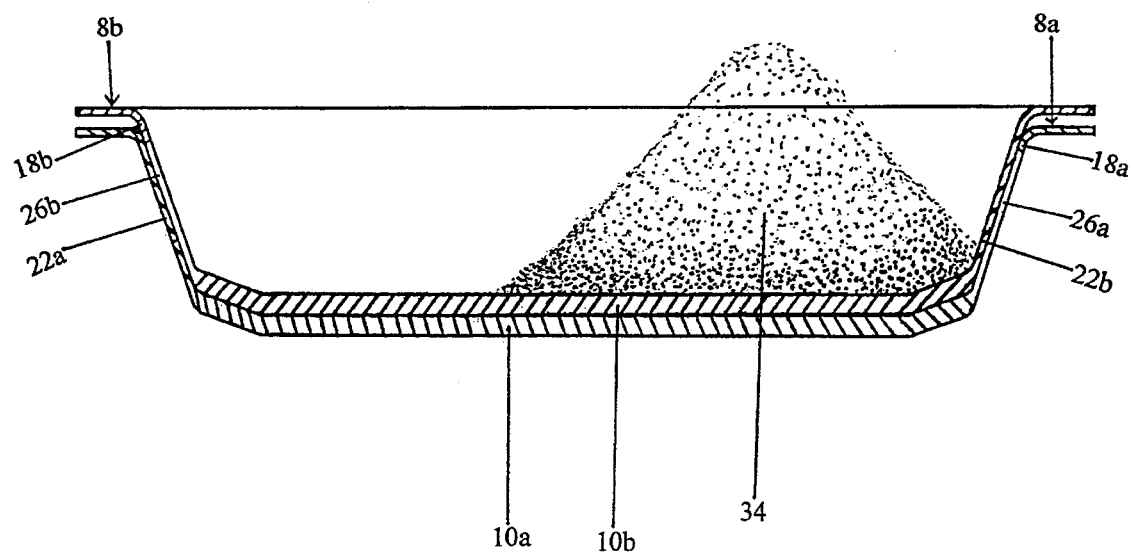
FIG. 6 is a sidewall cross-section view bisecting the nested trays through one of the sieve openings of each nested tray using a possible tray base configuration embodiment and showing the nested trays before the sifted static litter pile is leveled.

FIG. 6 illustrates the two-tray sifting device after nesting tray 8b, with the undisturbed sifted static litter pile, into tray 8a.

Figure 7:
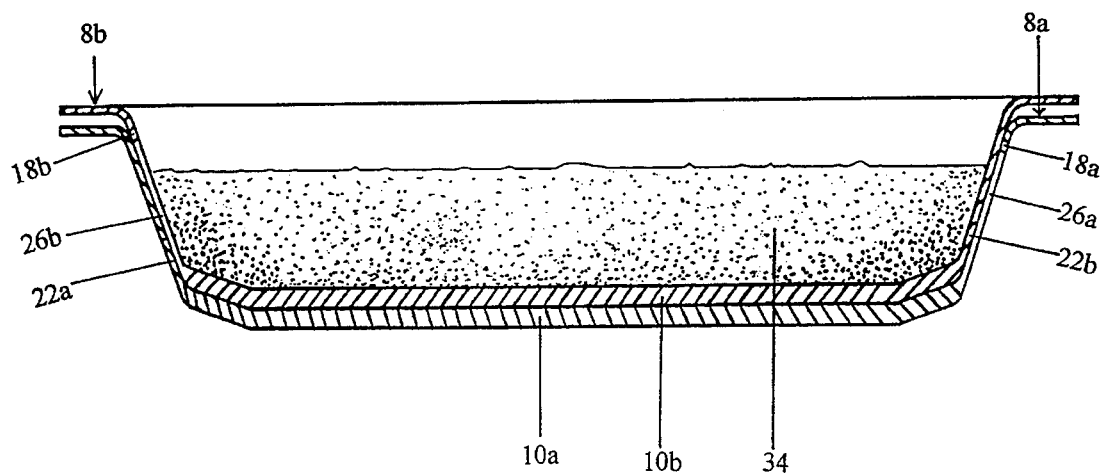
FIG. 7 is the sidewall cross-section view of nested trays after the sifted static litter pile is leveled.

FIG. 7 illustrates the two-tray sifting device after leveling the sifted litter 34 pile, into tray 8a.

Each tray 8 should be constructed of a material that is rigid enough to withstand any distortion, especially to its integrated sieve-wall side 18 over the service period of the device. The preferred tray 8 construction material is a polymer-plastic capable of being compression or injection molded while integrating the sieve openings 26 in a single operation. Any other materials, some of which are: metal, wood, pressboard, re-enforced cardboard, fiberglass, and glass could conceivably be used for manufacture using whatever method was most practical for the chosen material. Sieve openings could be integrated as a separate step to tray manufacture by subsequently die-cutting, drilling, sawing, stamping, or laser-cutting.

Feces are ordinarily deposited so as to lie within the litter horizontal to the tray base 10, experimentation has shown the preferable embodiment for the sieve openings to be vertical slots which run vertical to, and starting in the tray base 10 and extending upward for most of the sieve-wall 18 height, facilitating trapping the smaller fetes particles that, though rare, are narrower in width than the openings but linearly too long to pass through. Slots, also provide less impediment to the sifted material 34 thereby significantly speeding up the sifting process over other sieve opening 26 designs. Other possible sieve openings 26 patterns composed of all shapes of holes and slots configured at any angle relative to the tray base 10 are possible sieve embodiments, whether integrated into the sieve-wall 18 or subsequently affixed such as screens or grates if they are comprised of appropriately sized openings and do not inhibit tray nesting.

The perimeter flange 30 adds shape-supporting rigidity to the top of the tray 8 and is used as a hand-hold during the sifting operation. The perimeter flange 30 can range from a simple uniform design to more elaborate strategically positioned integrated hand-holds facilitating gripping, one example of such is seen in flange 30 FIG. 3.

This device can also be provided as a three or more tray array for separating differing sized mixed material from one another by arranging the nested array, top to bottom, ordered from largest to smallest sized sieve openings, each subsequent tray after sifting, will contain only the material that its opening-size prohibited from passing to the tray below.

OPERATION-FIGS. 1 to 7

The manner of using the sifting litter-box device FIGS. 1–7 is as follows:

If litter tray-liners are to be used then line the bottoms of two trays 8 FIG. 1 such that the sieve openings 26 are not blocked by any portion of the their respective litter tray-liners. Orient two lined or unlined like trays 8 depicted in FIG. 1 as is shown in FIG. 2 8a 8b. Nest one tray 8a into the other tray 8b so that their respective sieve openings 26a 26b are on opposite ends of the nested pair such that the sieve openings of the uppermost tray 26a are blocked by the solid back-wall 22b of the tray 8b below as shown in FIG. 3. Pour a suitable quantity of litter 34 into the uppermost tray 8a and shake the nested array thereby uniformly leveling the litter for use as is shown in FIG. 7. Place the nested array and litter in the customary place for access by the animal(s). FIG. 4 when litter 34 is sufficiently soiled and deemed ready to be sifted then, with the sieve-wall 18a of the uppermost tray 8a facing away from the User, grasp the perimeter flange 30a of the uppermost tray 8a a little behind the mid-point of sidewalls 14a and lift the uppermost tray 8a and tilting it forward and downward toward its sieve-wall 18a side allowing the loose reusable litter to pass through the sieve openings 26a and form a static pile of litter in the tray below 8b at the juncture formed by sidewalls 14b and sidewall 22b. Discard the feces and urine clumps retained in tray 8a and cleanse tray 8a in the customary manner. FIG. 5 place cleansed tray 8a, optionally relined, on a level place and lift tray 8b straight up with care not to disturb the static pile of litter 34 maintaining the relative sieve opening 26a 26b orientation shown. FIG. 6 nest tray 8b into tray 8a without disturbing the static pile of litter 34. FIG 7 level the static pile of litter by shaking the nested pair of trays 8b 8a readying the device once again for use. Periodically it will be necessary to add new litter at this point to maintain a suitable litter level.

SUMMARY, RAMIFICATIONS, and SCOPE

Accordingly, the reader can see that the sifting litter-box in its two tray configuration is elemental in its simplicity being bereft of all complication, yet a very functional and effective sifting device and having the following additional advantages eliminates the need for hand-implement sifting;

negates the need for additional implements to carry out the sifting function;

its simplicity immediately makes obvious its manner of usage;

its simplicity extends its ease of use to the elderly and capable children;

its simplicity-expedites manufacture;

its simplicity minimizes costs;

its simplicity obviates its more complicated prior art;

its simplicity and one pass operation minimizes total litter processing task time;

maximizes the retention of reusable litter:

eliminates the necessity of ever coming in contact with soiled litter;

eliminates the need for off-loading litter to an unrelated container for cleaning;

greatly decreases the objections to litter-box processing;

makes the processing of multiple litter-boxes much more practical for a single household;

provides a sifting device and method that can be expanded to sifting processes other than litter sifting that may require three or more trays in a nest to sift-separate more than two various sizes of particulate matter from a single heterogeneous mixture.

Although the description above contains many specifications, these should not be construed as limiting the scope of the sifting litter-box but merely providing illustrations of some of the presently preferred embodiments of this invention. For example, the sifting litter-box could be of any size that allows for forming a stack of nestable trays all having corresponding profiles and being sufficiently rigid to individually maintain their manufactured shape. Tray shapes could include rectangular, square, circular, oval, trapezoidal, triangular, etc.; the sieve openings could include: all of, a mixture of, or any manner of derivation of, the above shapes arranged in all manner of patterns. Tray sieve openings can be placed in any contiguous section along the upwardly projecting walls as long as a similarly configured tray in the stacked array nested below has its sieve section oriented in diametric opposition and provides a larger section of imperforate sidewall for blockage of the sieve openings of the tray nested above and tray bases are sufficiently large to accumulate, without leakage, a static pile of all the material sifted from the tray above.

Thus the scope of the sifting litter-box should be determined by the appended claims and their legal equivalents, rather than by the examples given.

I claim:

1. A device for sifting a siftable material, the device comprising at least two nestable trays, each tray having a base and sidewalls projecting upwardly and outwardly from the base to retain a siftable material and said trays having corresponding profiles so that said trays may be nested one atop another to form a vertically stacked array of said trays capable of holding a quantity of said material, a sieve wall of each tray is one of said sidewalls having a plurality of openings sized to permit a siftable material to pass through and to prevent the passage of substantially larger objects found in said material, a backwall of each tray is the opposing imperforate said sidewall furthermost removed from said sieve wall which, when properly oriented, prevents leakage of said siftable material through said plurality of openings of the tray nested immediately above, a perimeter flange forms an upper rim around each tray, providing supporting rigidity and a handle means for grasping each tray when it becomes the uppermost said tray in said stacked array, said sieve wall of each tray in said stacked array is oriented so that it is flush against said backwall of the tray into which it is nested, each tray being capable of sifting said material by lifting the uppermost tray by its said flange and tilting it downward toward its sieve wall thereby allowing the material therein to pass through said plurality of openings accumulating, as a static pile of sifted material, onto the solid base of the tray below toward its said backwall, while the uppermost tray retains all particulate material being larger than said plurality of openings, the sifted particulate material that is accumulated in said sifted static pile will not flow out of said plurality of openings of the tray in which it is accumulated, due to the static nature of particulate material at rest, as long as said static pile remains undisturbed, the lifted uppermost tray retaining the separated said larger objects, resulting from said sifting, may be emptied and cleaned, then be nested as the bottom tray in said stacked array, with said orientation without disturbing said static pile until after nesting is completed at which time said static pile may be leveled without leakage.

2. The sifting device of claim 1 wherein a pre-set pattern of said sieve plurality of openings is arranged symmetrically in said sieve wall.

3. The sifting device of claim 2 wherein said plurality of openings are uniformly spaced over a major portion of said sieve wall.

4. The sifting device of claim 3 wherein said plurality of openings comprise elongate rectangular slots arranged generally parallel to one another and extending substantially across said sieve wall.

5. The sifting device of claim 3 wherein the plurality of openings are generally square forming a grid uniformly spaced over a major portion of said sieve wall.

6. The sifting device of claim 3 wherein the plurality of openings are generally round forming a grid uniformly spaced over a major portion of said sieve wall.

7. The sifting device of claim 3 wherein the plurality of openings are generally oval forming a grid uniformly spaced over a major portion of said sieve wall.

8. The sifting device of claim 1 wherein said perimeter flange providing said handle means is flared laterally outward from said sidewalls at pre-set peripheral points to facilitate user grasping.

9. The sifting device of claim 1 which comprises a pet litter container dimensioned for a pet and adapted to be placed on the ground.

* * * * *

UNITED STATES PATENT AND TRADEMARK OFFICE
CERTIFICATE OF CORRECTION

PATENT NO. : 5,517.947
DATED : May 21, 1996
INVENTOR(S) : John W. Christman

It is certified that error appears in the above-indentified patent and that said Letters Patent is hereby corrected as shown below:

On the title page, item:

[57] ABSTRACT, Line 15, change "...which in then emptied."
to read as, "...which is then emptied."

Col. 1, approx. Line 32, change "...imperforate trays to rap the ..."
to read as, "...imperforate trays to trap the ..."

Col. 4, approx. Line 45, change "...trapping the smaller fetes particles that,..."
to read as, "...trapping the smaller feces particles that,..."

Signed and Sealed this

Twenty-eighth Day of January, 1997

Attest:

BRUCE LEHMAN

Attesting Officer    Commissioner of Patents and Trademarks